(12) United States Patent
Shen et al.

(10) Patent No.: US 9,094,169 B2
(45) Date of Patent: *Jul. 28, 2015

(54) ACKNAK AND CQI CHANNEL MAPPING SCHEMES IN WIRELESS NETWORKS

(71) Applicant: TEXAS INSTRUMENTS INCORPORATED, Dallas, TX (US)

(72) Inventors: Zukang Shen, Richardson, TX (US); Tarik Muharemovic, Pearland, TX (US); Pierre Bertrand, Antibes (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,259

(22) Filed: Jul. 8, 2014

(65) Prior Publication Data
US 2014/0321397 A1 Oct. 30, 2014

Related U.S. Application Data

(63) Continuation of application No. 12/361,505, filed on Jan. 28, 2009, now Pat. No. 8,774,156.

(60) Provisional application No. 61/024,286, filed on Jan. 29, 2008, provisional application No. 61/025,887, filed on Feb. 4, 2008, provisional application No. 61/032,516, filed on Feb. 29, 2008, provisional application No. 61/037,102, filed on Mar. 17, 2008, provisional application No. 61/038,246, filed on Mar. 20, 2008.

(51) Int. Cl.
| | |
|---|---|
| H04L 27/26 | (2006.01) |
| H04W 76/02 | (2009.01) |
| H04L 5/00 | (2006.01) |
| H04B 1/69 | (2011.01) |
| H04L 1/00 | (2006.01) |
| H04L 1/16 | (2006.01) |

(52) U.S. Cl.
CPC ............ *H04L 5/0053* (2013.01); *H04B 1/69* (2013.01); *H04L 5/0007* (2013.01); *H04L 5/0037* (2013.01); *H04L 5/0048* (2013.01); *H04L 27/2613* (2013.01); *H04L 1/0026* (2013.01); *H04L 1/1607* (2013.01); *H04W 76/022* (2013.01); *H04W 76/025* (2013.01)

(58) Field of Classification Search
CPC ... H04W 76/22; H04W 76/25; H04W 76/022; H04W 76/025; H04L 1/0007; H04L 5/73; H04L 27/2613
See application file for complete search history.

(56) References Cited

U.S. PATENT DOCUMENTS

2008/0268860 A1* 10/2008 Lunttila et al. ............... 455/450
2009/0092148 A1*  4/2009 Zhang et al. .................. 370/458

OTHER PUBLICATIONS

U.S. Appl. No. 60/944,074, filed Sep. 19, 2007.*
3GPP, "3rd Generaton Partnership Project: Technical Specification Group Radio Access Network; Evolved Universal Terrestrial Radio Access (E-UTRA); Physical Channels and Modulation", 3GPP TS 36.211, Release 8, V8.4.0, Valbonne, France, Sep. 2008, pp. 1-80.

* cited by examiner

*Primary Examiner* — Jianye Wu
(74) *Attorney, Agent, or Firm* — Ronald O. Neerings; Frank D. Cimino

(57) ABSTRACT

A transmission of information from a secondary to a primary node occurs in a plurality of N logical time durations. The transmission from the secondary to primary node in a wireless network is obtained using an orthogonal covering sequence and a second sequence. Embodiments of the present invention mitigate interference by calculating a first orthogonal covering (OC) index and a second OC Index from an indicator received from a serving base station (NodeB). A first index n1 is derived and a second index n2 is derived using the first index n1. A first orthogonal covering (OC) index and a first cyclic shift (CS) is determined using the derived index n1. A second OC and a second CS is derived using the derived index n2. A first slot of a subframe is generated using the OC indexed by the first OC index and the first CS and a second slot of the subframe is generated using the OC indexed by the second OC index and the second CS.

3 Claims, 5 Drawing Sheets

ACKNAK AND CQI CHANNEL MAPPING SCHEMES IN WIRELESS NETWORKS

CLAIM OF PRIORITY UNDER 35 U.S.C. 119(e)

The present application is a Continuation of application Ser. No. 12/361,505 filed Jan. 28, 2009, which claims priority to and incorporates by reference US Provisional Application No. 61/024,286, filed Jan. 29, 2008, entitled "UE-ACKNAK Channel Mapping Schemes" The present application also claims priority to and incorporates by reference US Provisional Application No. 61/025,887, filed Feb. 4, 2008, entitled "UE-ACKNAK Channel Mapping Schemes" The present application also claims priority to and incorporates by reference US Provisional Application No. 61/032,516, filed Feb. 29, 2008, entitled "UE-ACKNAK Channel Mapping Schemes." The present application also claims priority to and incorporates by reference US Provisional Application No. 61/037,102, tiled Mar. 17, 2008, entitled "UE-ACKNAK Channel Mapping Schemes." The present application also claims priority to and incorporates by reference US Provisional Application No. 61/038,245, filed Mar. 20, 2008, entitled "Slot Based CS/IOC Remapping on PUCCH".

FIELD OF THE INVENTION

This invention generally relates to wireless cellular communication, and in particular to use of block spreading codes in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request Indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. As seen from this example, some elements of the control information should be provided additional protection, when compared with other information. For instance, the ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (Release 8)." (3GPP TS 36.211)

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Orthogonal block spreading codes can be applied to multiple users for simultaneous transmission within the same frequency-time resource. Cell-specific cyclic shift (CS) hopping and slot based CS and orthogonal covering (OC) remapping on uplink control channels (a.k.a. PUCCH) may be performed. In this disclosure, a detailed CS hopping and slot based CS/OC remapping scheme for PUCCH is described, with application to UL ACK/NAK transmissions in correspondence to DL packets. In this disclosure, a block spreading code is sometimes denoted as an orthogonal sequence, orthogonal covering, or any other equivalent term.

Figure 1:
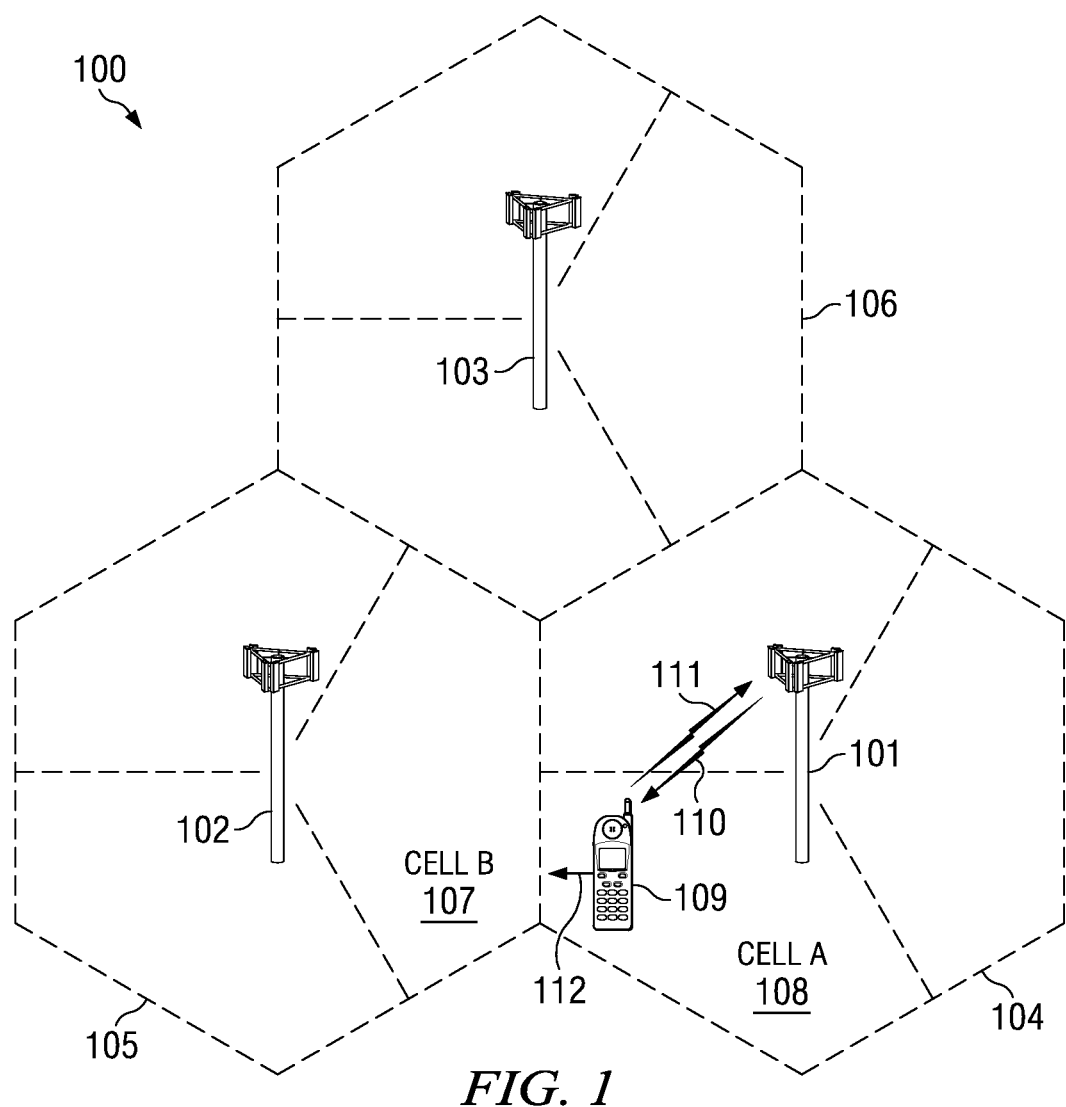
FIG. 1 is a pictorial of an illustrative telecommunications network that employs block spreading sequences.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102. A UE in a cell may be stationary such as within a home or office, or may be moving while a user is walking or riding in a vehicle. UE 109 moves within cell 108 with a velocity 112 relative to base station 102.

UE 109 uses an embodiment of the CS hopping and slot based CS/OC remapping scheme described in more detail below for PUCCH transmissions of ACKNAK to the serving NodeB, such as NodeB 101 while UE 109 is within cell 108.

Figure 2:
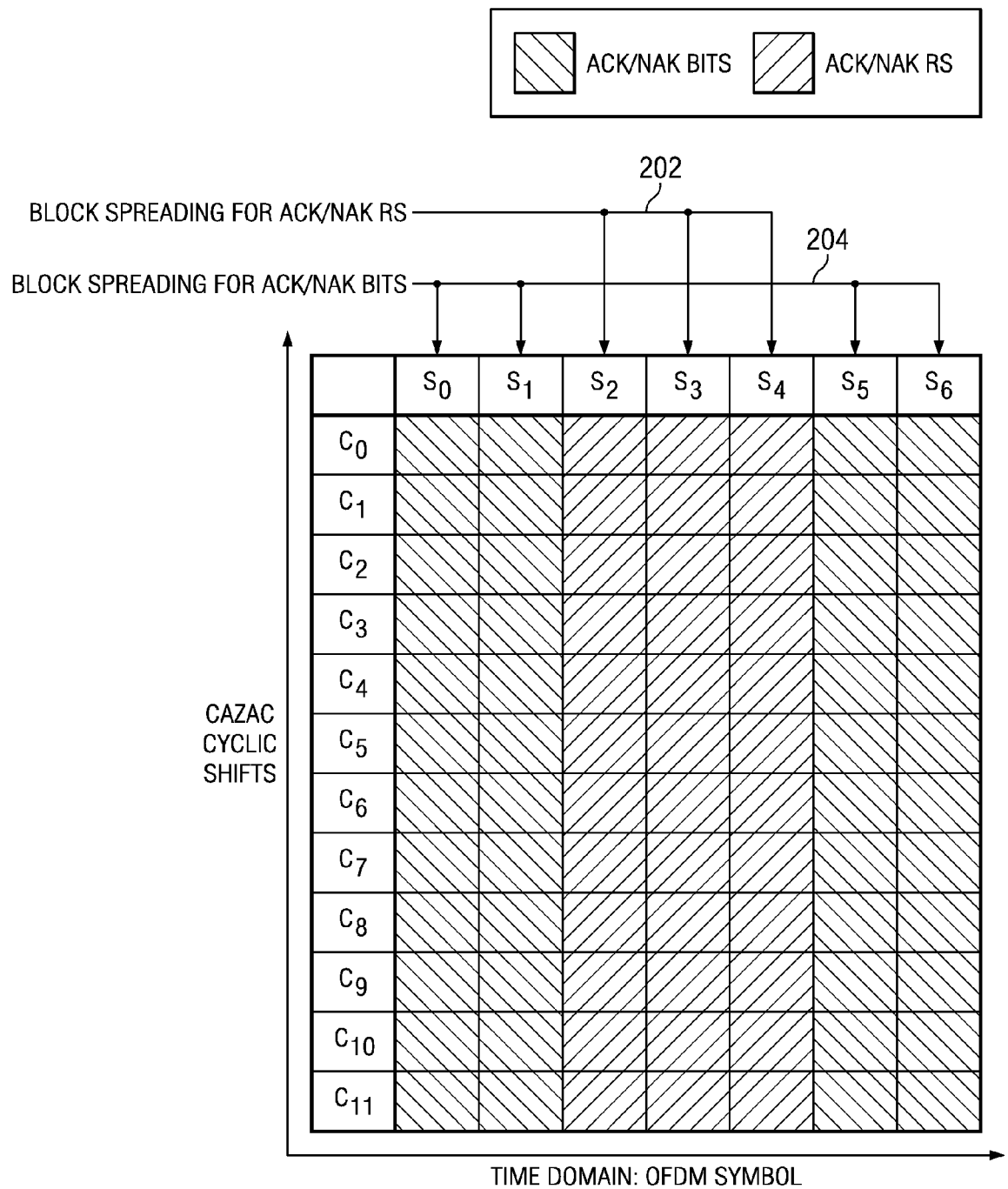
FIG. 2 illustrates a coherent orthogonal structure that supports transmission by multiple users within the same frequency and time resource.

FIG. 2 Illustrates a coherent orthogonal structure that supports transmission of ACKNAK on PUCCH by multiple users within the same frequency and time resource. FIG. 2 illustrates one slot of a transmission frame in which a normal cyclic prefix (CP) is used, where $c_0$-$c_{11}$ represent the cyclic shifts of a CAZAC-like sequence, and $S_0$-$S_6$ represent seven OFDM symbols per slot (0.5 ms). Without loss of generality, the middle three OFDM symbols $S_2$-$S_4$ are assumed to carry the reference signal (RS) for coherence demodulation, while the other four OFDM symbols carry the data information. Orthogonal covering 202 and 204 is applied to the RS OFDM symbols and the data bearing OFDM symbols, respectively.

The data bearing OFDM symbols can be binary phase shift keying (BPSK)modulated, quadrature phase shift keying (QPSK)modulated, or ON-OFF keying modulated.

Similarly, in one slot of a transmission frame in which an extended cyclic prefix (CP) is used there are only six symbols available per slot (0.5 ms). The middle two OFDM symbols are assumed to carry the reference signal (RS) for coherence demodulation, while the other four OFDM symbols carry the data information. Orthogonal covering is applied to the RS OFDM symbols and the data bearing OFDM symbols, respectively. The data bearing OFDM symbols are BPSK modulated, QPSK modulated, or ON-OFF keying modulated.

In each OFDM symbol, a cyclically shifted or phase ramped CAZAC-like sequence is transmitted. The CAZAC-like sequence in a RS OFDM symbol is un-modulated. The CAZAC-like sequence in a data OFDM symbol is modulated by the data symbol. Here the data symbol can be the ACK/NAK symbol, SRI symbol, Rank Indicator (RI) symbol, or CQI symbol. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff-Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n) = e^{j\phi(n)\pi/4}, \quad 0 \leq n \leq M_{sc}^{RS} - 1$$

where $M_{sc}^{RS} = 12$ and $\phi(n)$ is defined in Table 1.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term. In other places, the CAZAC-like sequence is generally referred to as the second sequence, while the block spreading code is generally referred to as the first sequence.

TABLE 1

Definition of $\phi(n)$

| u | $\phi(0), \ldots, \phi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |

TABLE 1-continued

Definition of φ(n)

| u | φ(0), . . . , φ(11) |   |   |   |   |   |   |   |   |   |   |   |
|----|----|----|----|----|----|----|----|----|----|----|----|----|
| 28 | −1 | 3  | −3 | 3  | −1 | 3  | 3  | −3 | 3  | 3  | −1 | −1 |
| 29 | 3  | −3 | −3 | −1 | −1 | −3 | −1 | 3  | −3 | 3  | 1  | −1 |

Block Spreading Codes

Figure 3:
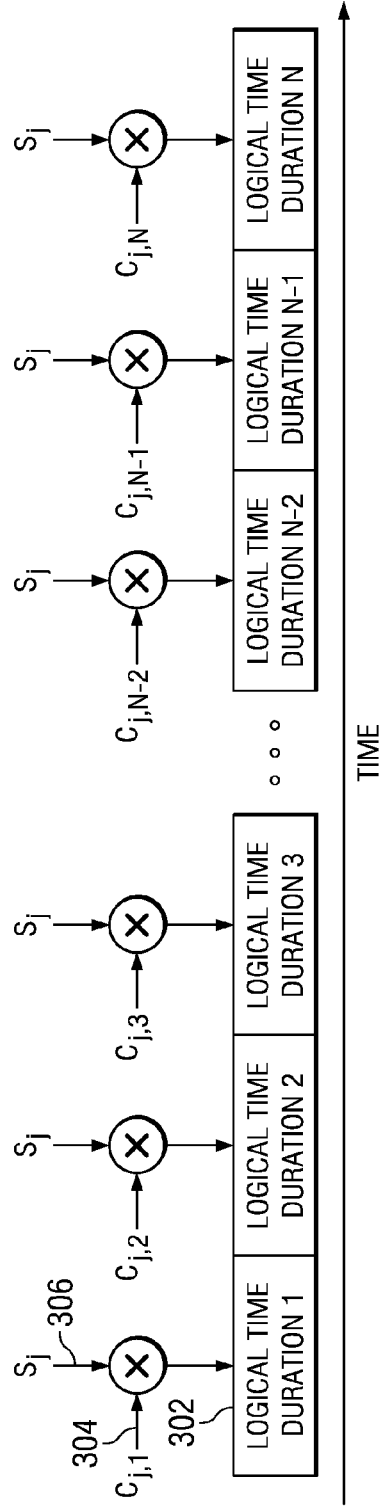
FIG. 3 is a diagram illustrating application of a block spreading code over a time frame.

In this disclosure, it is assumed that a block spreading code of length N is applied to N time durations. The N time durations can be consecutive or non-consecutive in time. Further, each of the time duration consists of one or multiple signal samples. FIG. 3 shows an example of a block spreading system over N time durations 302. $[c_{j,1}, c_{j,2}, \ldots, c_{j,N}]$ is the jth block spreading code, indicated in general as 304, which spreads the signal $S_j$, indicated in general as 306. If $S_j$ contains multiple signal samples, each signal sample is multiplied by block spreading symbol $c_{j,n}$ in the nth time duration, where $1 \leq n \leq N$. As will be described in more detail below, signal $S_j$ in some or each time duration 302 may be based on a different cyclic shift (CS) value.

In one embodiment, a restricted subset of block spreading codes having lower inter-user interference is selected from the set of block spread codes. A block spreading code in the restricted subset of block spreading codes may be assigned to UE of any velocity. The block spreading codes in the selected subset of block spreading codes may be explicitly or implicitly assigned to UEs multiplexed in the same frequency-time resource for the transmission of ACK/NAK and SRI, as will be described in more detail below.

A property of the restricted subset of block spreading codes is that element-wise product of at least a pair of orthogonal sequences in the restricted subset is mirror symmetric. The property of mirror symmetry of the element-wise product of two orthogonal sequences is useful for reducing interference, as the channel variation is linear or quasi-linear over the time duration where block spreading is applied.

Uplink ACK/NAK Structures

Coherent transmission with three RS OFDM symbols per slot may be used for uplink ACK/NAK transmission corresponding to scheduled downlink data service in one embodiment. In other embodiments, fewer or more RS symbols by be used. As described earlier, FIG. 2 shows a block diagram illustrating a coherent ACK/NAK transmission scheme per slot, where CS0-CS11 represent 12 cyclic shifts per resource block (RB) and S0-S6 denote seven OFDM symbols per slot. Although the exact RS symbol positions may vary from one embodiment to another, without loss of generality, an illustrative example can assume RS is transmitted in the 3rd, 4th, and 5th OFDM symbols, S2, S3 and S4.

In another embodiment, CS0-CS11 represent 12 different amounts of phase ramp applied to a root CAZAC-like sequence. A cyclic shifted sequence is obtained by a cyclic shift operation on the root sequence, which is typically defined in the time domain. Phase ramped sequence is obtained by a phase ramp operation on the root sequences, which is typically defined in the frequency domain. The proposed method in this disclosure applies to both cyclic shifted sequences and phase ramped sequences.

To increase the ACK/NAK multiplexing capacity, block spreading is applied to the RS OFDM symbols and ACK/NAK bearing OFDM symbols, respectively. For example, the RS OFDM symbols are covered by block spreading codes 202 of length three, while the ACK/NAK bearing OFDM symbols are covered with block spreading codes 204 of length four.

Figure 4:
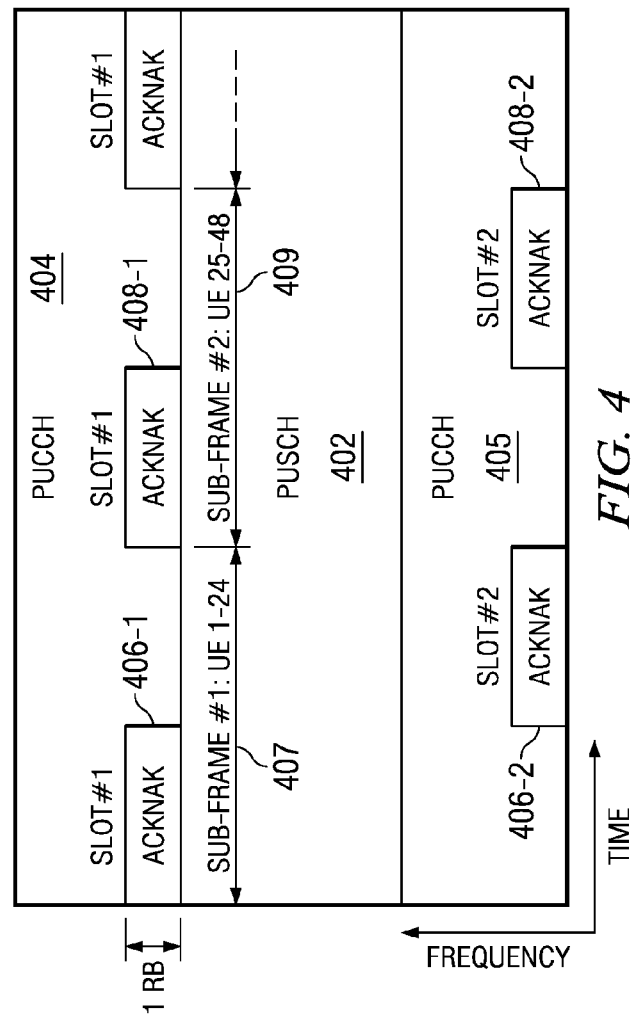
FIG. 4 is an illustration of transmission of ACK/NAK symbols using the orthogonal structure of FIG. 2.

FIG. 4 is frequency vs. time plot illustrating PUCCH 404, 405 and PUSCH 402, with ACKNAK transmitted in the PUCCH using the structure of FIG. 2. In this patent application, without loss of generality, an ACKNAK is sent on the PUCCH. ACKNAK is continuously allocated on one RB of the physical uplink control channel (PUCCH) such that a number of UEs can be multiplexed in one RB subframe, e.g. twenty-four UEs as indicated generally at 407. The next sequential subframe is indicated at 408 and can likewise support up to twenty-four UE. Within a sub-frame, the ACK-NAK hops at both edges of the system bandwidth on a slot basis. Each slot represents one-half of a subframe. For example, an ACKNAK in slot 406-1 of subframe 407 is in the higher frequency edge 404 and the ACKNAK is repeated in slot 406-2 of subframe 407 which is in the lower frequency edge 405 of the PUCCH. Similarly, slots 408-1, 408-2 carry ACKNAK for the next set of twenty-four UEs in subframe 409. In general, the first and second slot ACKNAK sequences are the same, but they may be different in some embodiments.

A detailed CS hopping and slot based CS/OC (cyclic shift/orthogonal covering) remapping scheme for PUCCH that is used in the structures illustrated in FIGS. 2-4 will now be described, with application to UL ACK/NAK transmissions in correspondence to DL packets.

ACKNAK Data Portion

In one embodiment, four possible OC sets are defined and available for the ACK/NAK data portion, as shown in Table 2. Recall from FIG. 2 that in this embodiment the data portion refers to symbols S0, S1, S5 and S6 for a normal CP or symbols S0, S1, S4 and S5 for an extended CP. Therefore, assuming the OC set indices are different for the two slots of any given subframe, there are six possible OC set combinations. Ideally, the slot based OC set remapping allows any possible combination of the OC sets for a subframe.

TABLE 2

ACK/NAK OC Set Index for ACK/NAK Data

| Set index | Orthogonal cover sequence | | |
|---|---|---|---|
| | $OC_{index} = 0$ | $OC_{index} = 1$ | $OC_{index} = 2$ |
| 1 | [+1 +1 +1 +1] | [+1 −1 +1 +1] | [+1 −1 −1 +1] |
| 2 | [+1 +1 −1 −1] | [+1 −1 −1 +1] | [+1 −1 +1 −1] |
| 3 | [+1 −1 −1 +1] | [+1 +1 −1 −1] | [+1 +1 +1 +1] |
| 4 | [+1 −1 +1 −1] | [+1 +1 +1 +1] | [+1 +1 −1 −1] |

Let "SFN" denote the subframe number, and "Cell ID" denote the cell ID, $OC_{set,0}$ and $OC_{set,1}$ denote the OC set index in slot 0 and slot 1 of a subframe, then the slot based OC set remapping can be a function of f(SFN, Cell ID), e.g.

$$OC_{set,0} = ((f(SFN, Cell\ ID)) \bmod 4) + 1 \quad (1)$$

$$OC_{set,1} = ((OC_{set,0} + ((f(SFN, Cell\ ID)) \bmod 3) + 1) \bmod 4) + 1 \quad (2)$$

In particular, let f(SFN, Cell ID)=SFN+Cell ID, then $$OC_{set,0} = ((SFN + Cell\ ID) \bmod 4) + 1 \quad (3)$$

$$OC_{set,1} = ((OC_{set,0} + ((SFN + Cell\ ID) \bmod 3) + 1) \bmod 4) + 1 \quad (4)$$

Assuming "Cell ID=0", Table 3 gives an example of slot based OC set remapping as a function of "SFN" from equations (3) and (4). In this embodiment, the slot based OC set remapping has a period of 12 and all possible OC set combinations are allowed, which improves OC set remapping for interference randomization.

TABLE 3

Example of Slot Based OC Set Remapping

| | SFN | | | | | | | | | | | | | | | | | | | | | | | |
|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| OC set, 0 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 |
| OC set, 1 | 2 | 4 | 2 | 1 | 3 | 1 | 4 | 2 | 4 | 3 | 1 | 3 | 2 | 4 | 2 | 1 | 3 | 1 | 4 | 2 | 4 | 3 | 1 | 3 |

ACK/NAK RS Part

Table 4 below shows an OC set for the ACK/NAK reference signal (RS) portion of a subframe, in normal and extended CP scenarios. Since there is only one OC set defined in this embodiment in either normal or extended CP, there is no need to perform OC set remapping between slots of a subframe. Recall from FIG. 2 that the RS portion refers to symbols S2, S3 and S4 for the normal CP embodiment, while in an extended CP embodiment the RS portion would refer to just two symbols in the center of the subframe.

TABLE 4

RS orthogonal cover sequences sets

| | Orthogonal cover sequence | | |
|---|---|---|---|
| | $OC_{index} = 0$ | $OC_{index} = 1$ | $OC_{index} = 2$ |
| Normal CP | [+1 +1 +1] | [+1 $e^{j2\pi/3}$ $e^{j4\pi/3}$] | [+1 $e^{j4\pi/3}$ $e^{j2\pi/3}$] |
| Extended CP | [+1 +1] | [+1 −1] | N.A. |

Slot Based CS/OC Sequence Remapping for ACK/NAK Data Part

In another embodiment, both the OC and the CS are different in each slot of the subframe. Let $\alpha_{slot,0}^{(0)}$ and $\alpha_{slot,1}^{(0)}$ denote the cyclic shift of a UE in the first OFDM symbol of the first and second slot in a subframe, respectively. Note $0 \leq \alpha_{slot,0}^{(0)}, \alpha_{slot,1}^{(0)} \leq N_{SC}^{RB}-1$, where $N_{SC}^{RB}=12$ denotes the number of CS per RB.

In the first slot, i.e. slot 0, given an ACK/NAK channel index $n_{AN}$, the CS index and OC sequence can be obtained by the following set of equations, where l denotes the OFDM symbol index within a slot ($0 \leq l \leq 6$). For additional description of the EUTA physical channels, see 3$^{rd}$ Generation Partnership Project; Technical Specification Group Radio Access Network; Evolved Universal Terrestrial Radio Access (E-UTRA); Physical Channels and Modulation (Release 8)." (3GPP TS 36.211 V8.4.0) Note, the term $\delta_{offset}^{PUCCH}$ may be defined as a constant or otherwise omitted in an alternative embodiment.

$$n_{oc} = \begin{cases} \lfloor n_{AN} \Delta_{shift}^{PUCCH} / N_{sc}^{RB} \rfloor & \text{for normal cyclic prefix (nCP)} \\ 2 \cdot \lfloor n_{AN} \Delta_{shift}^{PUCCH} / N_{sc}^{RB} \rfloor & \text{for extended cyclic prefix (xCP)} \end{cases}$$

$$\alpha(l) = (\alpha_{slot0}^{(0)} + f_{hop}(l)) \bmod N_{sc}^{RB}$$

$$\alpha_{slot0}^{(0)} = \begin{cases} (n_{AN} \Delta_{shift}^{PUCCH} + \delta_{offset}^{PUCCH} + (n_{oc} \bmod \Delta_{shift}^{PUCCH})) \bmod N_{sc}^{RB} & \text{for nCP} \\ (n_{AN} \Delta_{shift}^{PUCCH} + \delta_{offset}^{PUCCH} + n_{oc}/2) \bmod N_{sc}^{RB} & \text{for xCP} \end{cases}$$

In order to perform slot based CS/OC sequence remapping, the following equations may be adopted in the second slot to calculate the CS index and OC sequence index.

$$n_{oc} = \begin{cases} (n_{AN}) \bmod 3 & \text{for normal cyclic prefix} \\ 2 \cdot ((n_{AN}) \bmod 2) & \text{for extended cyclic prefix} \end{cases}$$

$$\alpha(l) = (\alpha_{slot1}^{(0)} + f_{hop}(l)) \bmod N_{sc}^{RB}$$

$$\alpha_{slot1}^{(0)} = \begin{cases} (\lfloor n_{AN}/3 \rfloor \Delta_{shift}^{PUCCH} + \delta_{offset}^{PUCCH} + (n_{oc} \bmod \Delta_{shift}^{PUCCH})) \bmod N_{sc}^{RB} & \text{for nCP} \\ (\lfloor n_{AN}/2 \rfloor \Delta_{shift}^{PUCCH} + \delta_{offset}^{PUCCH} + n_{oc}/2) \bmod N_{sc}^{RB} & \text{for xCP} \end{cases}$$

Slot Based CS/OC Sequence Remapping for ACK/NAK RS Part

For the ACK/NAK RS part, in slot 0, the CS index and OC sequence are obtained by the following equations. Again, note the term $\delta_{offset}^{PUCCH}$ may be defined as a constant or otherwise omitted in an alternative embodiment.

$$\bar{n}_{oc} = \lfloor n_{AN} \Delta_{shift}^{PUCCH} / N_{sc}^{RB} \rfloor$$

$$\alpha(l) = (\alpha_{slot0}^{(0)} + f_{hop}(l)) \bmod N_{sc}^{RB}$$

$$\alpha_{slot0}^{(0)} = \begin{cases} (n_{AN} \Delta_{shift}^{PUCCH} + \delta_{offset}^{PUCCH} + (\bar{n}_{oc} \bmod \Delta_{shift}^{PUCCH})) \bmod N_{sc}^{RB} & \text{for nCP} \\ (n_{AN} \Delta_{shift}^{PUCCH} + \delta_{offset}^{PUCCH} + \bar{n}_{oc}) \bmod N_{sc}^{RB} & \text{for xCP} \end{cases}$$

In order to perform slot based CS index and OC sequence remapping, the following equation may be used to calculate CS index and OC sequence index in slot 1.

$$\bar{n}_{oc} = \begin{cases} (n_{AN}) \bmod 3 & \text{for normal cyclic prefix} \\ (n_{AN}) \bmod 2 & \text{for extended cyclic prefix} \end{cases}$$

$$\alpha(l) = (\alpha_{slot1}^{(0)} + f_{hop}(l)) \bmod N_{sc}^{RB}$$

$$\alpha_{slot1}^{(0)} = \begin{cases} (\lfloor n_{AN}/3 \rfloor \Delta_{shift}^{PUCCH} + \Delta_{offset}^{PUCCH} + (\bar{n}_{oc} \bmod \Delta_{shift}^{PUCCH})) \bmod N_{sc}^{RB} & \text{for nCP} \\ (\lfloor n_{AN}/2 \rfloor \Delta_{shift}^{PUCCH} + \delta_{offset}^{PUCCH} + \bar{n}_{oc}) \bmod N_{sc}^{RB} & \text{for xCP} \end{cases}$$

Tables (5, 6), (7, 8), (9, 10), (11, 12), (13, 14), and (15, 16) show a few examples of the proposed slot based CS/OC sequence remapping, wherein K is equivalent to $n_{AN}$.

TABLE 5

Example of CS/OC Sequence Remapping, Slot 0, $\Delta_{shift}^{PUCCH} = 2$, Normal CP

| Cell specific cyclic shift offset | | RS orthogonal cover | | | ACK/NACK orthogonal cover | | |
|---|---|---|---|---|---|---|---|
| $\delta_{offset} = 1$ | $\delta_{offset} = 0$ | $OC_{index} = 0$ | $OC_{index} = 1$ | $OC_{index} = 2$ | $OC_{index} = 0$ | $OC_{index} = 1$ | $OC_{index} = 2$ |
| $CS_{index} = 1$ | $CS_{index} = 0$ | k = 0 |  | 12 | k = 0 |  | 12 |
| 2 | 1 |  | 6 |  |  | 6 |  |
| 3 | 2 | 1 |  | 13 | 1 |  | 13 |
| 4 | 3 |  | 7 |  |  | 7 |  |
| 5 | 4 | 2 |  | 14 | 2 |  | 14 |
| 6 | 5 |  | 8 |  |  | 8 |  |
| 7 | 6 | 3 |  | 15 | 3 |  | 15 |
| 8 | 7 |  | 9 |  |  | 9 |  |
| 9 | 8 | 4 |  | 16 | 4 |  | 16 |
| 10 | 9 |  | 10 |  |  | 10 |  |
| 11 | 10 | 5 |  | 17 | 5 |  | 17 |
| 0 | 11 |  | 11 |  |  | 11 |  |

TABLE 6

Example of CS/OC Sequence Remapping, Slot 1, $\Delta_{shift}^{PUCCH} = 2$, Normal CP

| Cell specific cyclic shift offset | | RS orthogonal cover | | | ACK/NACK orthogonal cover | | |
|---|---|---|---|---|---|---|---|
| $\delta_{offset} = 1$ | $\delta_{offset} = 0$ | $OC_{index} = 0$ | $OC_{index} = 1$ | $OC_{index} = 2$ | $OC_{index} = 0$ | $OC_{index} = 1$ | $OC_{index} = 2$ |
| $CS_{index} = 1$ | $CS_{index} = 0$ | k = 0 |  | 2 | k = 0 |  | 2 |
| 2 | 1 |  | 1 |  |  | 1 |  |
| 3 | 2 | 3 |  | 5 | 3 |  | 5 |
| 4 | 3 |  | 4 |  |  | 4 |  |
| 5 | 4 | 6 |  | 8 | 6 |  | 8 |
| 6 | 5 |  | 7 |  |  | 7 |  |
| 7 | 6 | 9 |  | 11 | 9 |  | 11 |
| 8 | 7 |  | 10 |  |  | 10 |  |
| 9 | 8 | 12 |  | 14 | 12 |  | 14 |
| 10 | 9 |  | 13 |  |  | 13 |  |
| 11 | 10 | 15 |  | 17 | 15 |  | 17 |
| 0 | 11 |  | 16 |  |  | 16 |  |

TABLE 7

Example of CS/OC Sequence Remapping, Slot 0, $\Delta_{shift}^{PUCCH} = 3$, Normal CP

| Cell specific cyclic shift offset | | | RS orthogonal cover | | | ACK/NACK orthogonal cover | | |
|---|---|---|---|---|---|---|---|---|
| $\delta_{offset} = 2$ | $\delta_{offset} = 1$ | $\delta_{offset} = 0$ | $OC_{index} = 1$ | $OC_{index} = 2$ | $OC_{index} = 3$ | $OC_{index} = 1$ | $OC_{index} = 2$ | $OC_{index} = 3$ |
| $CS_{index} = 2$ | $CS_{index} = 1$ | $CS_{index} = 0$ | k = 0 |  | 4 | k = 0 |  | 4 |
| 3 | 2 | 1 |  |  | 8 |  |  | 8 |
| 4 | 3 | 2 | 1 |  |  | 1 |  |  |
| 5 | 4 | 3 |  | 5 |  |  | 5 |  |
| 6 | 5 | 4 |  |  | 9 |  |  | 9 |
| 7 | 6 | 5 | 2 |  |  | 2 |  |  |
| 8 | 7 | 6 |  | 6 |  |  | 6 |  |
| 9 | 8 | 7 |  |  | 10 |  |  | 10 |
| 10 | 9 | 8 | 3 |  |  | 3 |  |  |
| 11 | 10 | 9 |  | 7 |  |  | 7 |  |
| 0 | 11 | 10 |  |  | 11 |  |  | 11 |
| 1 | 0 | 11 |  |  |  |  |  |  |

TABLE 8

Example of CS/OC Sequence Remapping, Slot 1, $\Delta_{shift}^{PUCCH} = 3$, Normal CP

| Cell specific cyclic shift offset | | | RS orthogonal cover | | | ACK/NACK orthogonal cover | | |
|---|---|---|---|---|---|---|---|---|
| $\delta_{offset} = 2$ | $\delta_{offset} = 1$ | $\delta_{offset} = 0$ | $OC_{index} = 1$ | $OC_{index} = 2$ | $OC_{index} = 3$ | $OC_{index} = 1$ | $OC_{index} = 2$ | $OC_{index} = 3$ |
| $CS_{index} = 2$ | $CS_{index} = 1$ | $CS_{index} = 0$ | k = 0 | | | k = 0 | | |
| 3 | 2 | 1 | | 1 | | | 1 | |
| 4 | 3 | 2 | | | 2 | | | 2 |
| 5 | 4 | 3 | 3 | | | 3 | | |
| 6 | 5 | 4 | | 4 | | | 4 | |
| 7 | 6 | 5 | | | 5 | | | 5 |
| 8 | 7 | 6 | 6 | | | 6 | | |
| 9 | 8 | 7 | | 7 | | | 7 | |
| 10 | 9 | 8 | | | 8 | | | 8 |
| 11 | 10 | 9 | 9 | | | 9 | | |
| 0 | 11 | 10 | | 10 | | | 10 | |
| 1 | 0 | 11 | | | 11 | | | 11 |

TABLE 9

Example of CS/OC Sequence Remapping, Slot 0, $\Delta_{shift}^{PUCCH} = 1$, Normal CP

| | RS orthogonal cover | | | ACK/NACK orthogonal cover | | |
|---|---|---|---|---|---|---|
| | $OC_{index} = 0$ | $OC_{index} = 1$ | $OC_{index} = 2$ | $OC_{index} = 0$ | $OC_{index} = 1$ | $OC_{index} = 2$ |
| $CS_{index} = 0$ | k = 0 | 12 | 24 | k = 0 | 12 | 24 |
| 1 | 1 | 13 | 25 | 1 | 13 | 25 |
| 2 | 2 | 14 | 26 | 2 | 14 | 26 |
| 3 | 3 | 15 | 27 | 3 | 15 | 27 |
| 4 | 4 | 16 | 28 | 4 | 16 | 28 |
| 5 | 5 | 17 | 29 | 5 | 17 | 29 |
| 6 | 6 | 18 | 30 | 6 | 18 | 30 |
| 7 | 7 | 19 | 31 | 7 | 19 | 31 |
| 8 | 8 | 20 | 32 | 8 | 20 | 32 |
| 9 | 9 | 21 | 33 | 9 | 21 | 33 |
| 10 | 10 | 22 | 34 | 10 | 22 | 34 |
| 11 | 11 | 23 | 35 | 11 | 23 | 35 |

TABLE 10

Example of CS/OC Sequence Remapping, Slot 1, $\Delta_{shift}^{PUCCH} = 1$, Normal CP

| | RS orthogonal cover | | | ACK/NACK orthogonal cover | | |
|---|---|---|---|---|---|---|
| | $OC_{index} = 0$ | $OC_{index} = 1$ | $OC_{index} = 2$ | $OC_{index} = 0$ | $OC_{index} = 1$ | $OC_{index} = 2$ |
| $CS_{index} = 0$ | k = 0 | 1 | 2 | k = 0 | 1 | 2 |
| 1 | 3 | 4 | 5 | 3 | 4 | 5 |
| 2 | 6 | 7 | 8 | 6 | 7 | 8 |
| 3 | 9 | 10 | 11 | 9 | 10 | 11 |
| 4 | 12 | 13 | 14 | 12 | 13 | 14 |
| 5 | 15 | 16 | 17 | 15 | 16 | 17 |
| 6 | 18 | 19 | 20 | 18 | 19 | 20 |
| 7 | 21 | 22 | 23 | 21 | 22 | 23 |
| 8 | 24 | 25 | 26 | 24 | 25 | 26 |
| 9 | 27 | 28 | 29 | 27 | 28 | 29 |
| 10 | 30 | 31 | 32 | 30 | 31 | 32 |
| 11 | 33 | 34 | 35 | 33 | 34 | 35 |

TABLE 11

Example of CS/OC Sequence Remapping, Slot 0, $\Delta_{shift}^{PUCCH} = 2$, Extended CP

| Cell specific cyclic shift offset | | RS orthogonal cover | | ACK/NACK orthogonal cover | |
|---|---|---|---|---|---|
| $\delta_{offset} = 1$ | $\delta_{offset} = 0$ | $OC_{index} = 0$ | $OC_{index} = 1$ | $OC_{index} = 0$ | $OC_{index} = 2$ |
| $CS_{index} = 1$ | $CS_{index} = 0$ | k = 0 | | k = 0 | |
| 2 | 1 | | 6 | | 6 |

TABLE 11-continued

Example of CS/OC Sequence Remapping, Slot 0, $\Delta_{shift}^{PUCCH} = 2$, Extended CP

| Cell specific cyclic shift offset | | RS orthogonal cover | | ACK/NACK orthogonal cover | |
|---|---|---|---|---|---|
| $\delta_{offset} = 1$ | $\delta_{offset} = 0$ | $OC_{index} = 0$ | $OC_{index} = 1$ | $OC_{index} = 0$ | $OC_{index} = 2$ |
| 3  | 2  | 1  |    | 1  |    |
| 4  | 3  |    | 7  |    | 7  |
| 5  | 4  | 2  |    | 2  |    |
| 6  | 5  |    | 8  |    | 8  |
| 7  | 6  | 3  |    | 3  |    |
| 8  | 7  |    | 9  |    | 9  |
| 9  | 8  | 4  |    | 4  |    |
| 10 | 9  |    | 10 |    | 10 |
| 11 | 10 | 5  |    | 5  |    |
| 0  | 11 |    | 11 |    | 11 |

TABLE 12

Example of CS/OC Sequence Remapping, Slot 1, $\Delta_{shift}^{PUCCH} = 2$, Extended CP

| Cell specific cyclic shift offset | | RS orthogonal cover | | ACK/NACK orthogonal cover | |
|---|---|---|---|---|---|
| $\delta_{offset} = 1$ | $\delta_{offset} = 0$ | $OC_{index} = 0$ | $OC_{index} = 1$ | $OC_{index} = 0$ | $OC_{index} = 2$ |
| $CS_{index} = 1$ | $CS_{index} = 0$ | k = 0 |   | k = 0 |   |
| 2  | 1  |    | 1  |    | 1  |
| 3  | 2  | 2  |    | 2  |    |
| 4  | 3  |    | 3  |    | 3  |
| 5  | 4  | 4  |    | 4  |    |
| 6  | 5  |    | 5  |    | 5  |
| 7  | 6  | 6  |    | 6  |    |
| 8  | 7  |    | 7  |    | 7  |
| 9  | 8  | 8  |    | 8  |    |
| 10 | 9  |    | 9  |    | 9  |
| 11 | 10 | 10 |    | 10 |    |
| 0  | 11 |    | 11 |    | 11 |

TABLE 13

Example of CS/OC Sequence Remapping, Slot 0, $\Delta_{shift}^{PUCCH} = 3$, Extended CP

| Cell specific cyclic shift offset | | | RS orthogonal cover | | ACK/NACK orthogonal cover | |
|---|---|---|---|---|---|---|
| $\delta_{offset} = 2$ | $\delta_{offset} = 1$ | $\delta_{offset} = 0$ | $OC_{index} = 0$ | $OC_{index} = 1$ | $OC_{index} = 0$ | $OC_{index} = 2$ |
| $CS_{index} = 2$ | $CS_{index} = 1$ | $CS_{index} = 0$ | k = 0 |   | k = 0 |   |
| 3  | 2  | 1  |    | 4  |    | 4  |
| 4  | 3  | 2  |    |    |    |    |
| 5  | 4  | 3  | 1  |    | 1  |    |
| 6  | 5  | 4  |    | 5  |    | 5  |
| 7  | 6  | 5  |    |    |    |    |
| 8  | 7  | 6  | 2  |    | 2  |    |
| 9  | 8  | 7  |    | 6  |    | 6  |
| 10 | 9  | 8  |    |    |    |    |
| 11 | 10 | 9  | 3  |    | 3  |    |
| 0  | 11 | 10 |    | 7  |    | 7  |
| 1  | 0  | 11 |    |    |    |    |

TABLE 14

Example of CS/OC Sequence Remapping, Slot 1, $\Delta_{shift}^{PUCCH} = 3$, Extended CP

| Cell specific cyclic shift offset | | | RS orthogonal cover | | ACK/NACK orthogonal cover | |
|---|---|---|---|---|---|---|
| $\delta_{offset} = 2$ | $\delta_{offset} = 1$ | $\delta_{offset} = 0$ | $OC_{index} = 0$ | $OC_{index} = 1$ | $OC_{index} = 0$ | $OC_{index} = 2$ |
| $CS_{index} = 2$ | $CS_{index} = 1$ | $CS_{index} = 0$ | k = 0 |   | k = 0 |   |
| 3 | 2 | 1 |   | 1 |   | 1 |

TABLE 14-continued

Example of CS/OC Sequence Remapping, Slot 1, $\Delta_{shift}^{PUCCH} = 3$, Extended CP

| Cell specific cyclic shift offset | | | RS orthogonal cover | | ACK/NACK orthogonal cover | |
|---|---|---|---|---|---|---|
| $\delta_{offset} = 2$ | $\delta_{offset} = 1$ | $\delta_{offset} = 0$ | $OC_{index} = 0$ | $OC_{index} = 1$ | $OC_{index} = 0$ | $OC_{index} = 2$ |
| 4 | 3 | 2 | | | | |
| 5 | 4 | 3 | 2 | | 2 | |
| 6 | 5 | 4 | | 3 | | 3 |
| 7 | 6 | 5 | | | | |
| 8 | 7 | 6 | 4 | | 4 | |
| 9 | 8 | 7 | | 5 | | 5 |
| 10 | 9 | 8 | | | | |
| 11 | 10 | 9 | 6 | | 6 | |
| 0 | 11 | 10 | | 7 | | 7 |
| 1 | 0 | 11 | | | | |

TABLE 15

Example of CS/OC Sequence Remapping, Slot 0, $\Delta_{shift}^{PUCCH} = 1$, Extended CP

| | RS orthogonal cover | | ACK/NACK orthogonal cover | |
|---|---|---|---|---|
| | $OC_{index} = 0$ | $OC_{index} = 1$ | $OC_{index} = 0$ | $OC_{index} = 2$ |
| $CS_{index} = 0$ | k = 0 | 12 | k = 0 | 12 |
| 1 | 1 | 13 | 1 | 13 |
| 2 | 2 | 14 | 2 | 14 |
| 3 | 3 | 15 | 3 | 15 |
| 4 | 4 | 16 | 4 | 16 |
| 5 | 5 | 17 | 5 | 17 |
| 6 | 6 | 18 | 6 | 18 |
| 7 | 7 | 19 | 7 | 19 |
| 8 | 8 | 20 | 8 | 20 |
| 9 | 9 | 21 | 9 | 21 |
| 10 | 10 | 22 | 10 | 22 |
| 11 | 11 | 23 | 11 | 23 |

TABLE 16

Example of CS/OC Sequence Remapping, Slot 1, $\Delta_{shift}^{PUCCH} = 1$, Extended CP

| | RS orthogonal cover | | ACK/NACK orthogonal cover | |
|---|---|---|---|---|
| | $OC_{index} = 0$ | $OC_{index} = 1$ | $OC_{index} = 0$ | $OC_{index} = 2$ |
| $CS_{index} = 0$ | k = 0 | 1 | k = 0 | 2 |
| 1 | 3 | 4 | 3 | 5 |
| 2 | 6 | 7 | 6 | 8 |
| 3 | 9 | 10 | 9 | 11 |
| 4 | 12 | 13 | 12 | 14 |
| 5 | 15 | 16 | 15 | 17 |
| 6 | 18 | 19 | 18 | 20 |
| 7 | 21 | 22 | 21 | 23 |
| 8 | 24 | 25 | 24 | 26 |
| 9 | 27 | 28 | 27 | 29 |
| 10 | 30 | 31 | 30 | 32 |
| 11 | 33 | 34 | 33 | 35 |

In addition, the proposed slot based OC/CS remapping can be expressed in the following way. 3GPP TS 36.211 Release 8 defines several formats for the transmission of ACKNAK information, including format 1, 1a and 1b. In this description, notations are adopted from 3GPP TS 36.211 Release 8. For notations not explicitly described in this document, please refer to TS 36.211 Release 8. The notation $n_s$ refers to the slot number of a given OFDM symbol.

Resources used for transmission of PUCCH format 1, 1a and 1b are identified by a resource index $n_{PUCCH}^{(1)}$ from which the orthogonal sequence index $n_{oc}(n_s)$ and the cyclic shift $\alpha(n_s)$ are determined according to:

$$n_{oc}(n_s) = \begin{cases} \lfloor n'(n_s) \cdot \Delta_{shift}^{PUCCH}/N' \rfloor & \text{for normal cyclic prefix } (nCP) \\ 2 \cdot \lfloor n'(n_s) \cdot \Delta_{shift}^{PUCCH}/N' \rfloor & \text{for extended cyclic prefix } (xCP) \end{cases}$$

$$\alpha(n_s) = 2\pi \cdot n_{cs}(n_s)/N_{sc}^{RB}$$

$$n_{cs}(n_s) = \begin{cases} [n_{cs}^{cell}(n_s, l) + (n'(n_s) \cdot \Delta_{shift}^{PUCCH} + (n_{oc}(n_s) \bmod \Delta_{shift}^{PUCCH})) \bmod N'] \bmod N_{sc}^{RB} & (nCP) \\ [n_{cs}^{cell}(n_s, l) + (n'(n_s) \cdot \Delta_{shift}^{PUCCH} + n_{oc}(n_s)/2) \bmod N'] \bmod N_{sc}^{RB} & (xCP) \end{cases}$$

where $$N' = \begin{cases} N_{cs}^{(1)} & \text{if } n_{PUCCH}^{(1)} < c \cdot N_{cs}^{(1)}/\Delta_{shift}^{PUCCH} \\ N_{sc}^{RB} & \text{otherwise} \end{cases}$$

$$c = \begin{cases} 3 & \text{normal cyclic prefix} \\ 2 & \text{extended cyclic prefix} \end{cases}$$

The resource indices within the two resource blocks in the two slots of a subframe to which the PUCCH is mapped are given by:

$$n'(n_s) = \begin{cases} n_{PUCCH}^{(1)} & \text{if } n_{PUCCH}^{(1)} < c \cdot N_{cs}^{(1)} / \Delta_{shift}^{PUCCH} \\ (n_{PUCCH}^{(1)} - c \cdot N_{cs}^{(1)} / \Delta_{shift}^{PUCCH}) \bmod (c \cdot N_{sc}^{RB} / \Delta_{shift}^{PUCCH}) & \text{otherwise} \end{cases}$$

for $n_s \bmod 2 = 0$ and by $$n'(n_s) = \begin{cases} [3(n'(n_s) + 1)] \bmod (3 N_{sc}^{RB} / \Delta_{shift}^{PUCCH} + 1) - 1 & \text{for normal } CP \\ & \text{and } n_{PUCCH}^{(1)} \geq c \cdot N_{cs}^{(1)} / \Delta_{shift}^{PUCCH} \\ \text{floor}(n'(n_s - 1)/c) + ((n'(n_s - 1)) \bmod c) \cdot (N' / \Delta_{shift}^{PUCCH}) & \text{otherwise} \end{cases}$$

for $n_s \bmod 2 = 1$.

If used in an embodiment, the quantities $$\Delta_{shift}^{PUCCH} \in \{1, 2, 3\}$$

$$\Delta_{offset}^{PUCCH} \in \{0, 1, \ldots, \Delta_{shift}^{PUCCH} - 1\}$$

are set by higher layers.

Alternatively, the following equation may be used to determine $n'(n_s)$:

$$n'(n_s) = \text{floor}(n'(n_s - 1)/c) + ((n'(n_s - 1)) \bmod c) \cdot (N'/\Delta_{shift}^{PUCCH})$$

for $n_s \bmod 2 = 1$.

Alternatively, the following equation may be used to determine $n'(n_s)$:

for normal cyclic prefix and $n_{PUCCH}^{(1)} \geq c \cdot N_{cs}^{(1)} / \Delta_{shift}^{PUCCH}$ $$n'(n_s) = \begin{cases} [3(n'(n_s) + 1)] \bmod (3 N_{sc}^{RB} / \Delta_{shift}^{PUCCH} + 1) - 1 \end{cases}$$

otherwise:

$$n'(n_s) = \{\lfloor ((n'(n_s - 1) + \phi) \bmod (cN' / \Delta_{shift}^{PUCCH})) / c \rfloor + \\ ((n'(n_s - 1) + \phi) \bmod (cN' / \Delta_{shift}^{PUCCH})) \bmod c) \cdot (N' / \Delta_{shift}^{PUCCH})$$

for $n_s \bmod 2 = 1$, where exemplary values for $\phi$ are $\phi = 0$, $\phi = 1$, $\phi = 2, \ldots$.

Notice that the value of $\phi$ can be different for normal CP and extended CP. For example, $\phi = 0$ for extended CP and $\phi = 2$ for normal CP.

The value of $\phi$ can be semi-statically configured. It is not precluded that the value of $\phi$ can be cell specific, or NodeB specific, or common to all cells/NodeBs in the system.

Alternatively, the following equation may be used to determine $n'(n_s)$:

$$n'(n_s) = \lfloor \bmod(n'(n_s-1)+\phi, cN'/\Delta_{shift}^{PUCCH})/c \rfloor + \\ ((\bmod(n'(n_s-1)+\phi, cN'/\Delta_{shift}^{PUCCH})) \bmod c) \cdot \\ (N'/\Delta_{shift}^{PUCCH})$$

In other words, the value $\phi$ is an offset or a shift in the orthogonal covering (OC) domain, when slot based CS/OC remapping is applied in the second slot of a subframe. The offset (or shift) of $\phi$ is applied to all ACK/NAK channels, and the operation is modular. Tables 17 and 18 show an example of $\phi = 1$. Tables 19 and 20 show an example of $\phi = 2$.

TABLE 17

Example of CS/OC Sequence Remapping, Slot 0, $\Delta_{shift}^{PUCCH} = 2$, Normal CP

| Cell specific cyclic shift offset | | RS orthogonal cover | | | ACK/NACK orthogonal cover | | |
|---|---|---|---|---|---|---|---|
| $\delta_{offset} = 1$ | $\delta_{offset} = 0$ | $OC_{index} = 0$ | $OC_{index} = 1$ | $OC_{index} = 2$ | $OC_{index} = 0$ | $OC_{index} = 1$ | $OC_{index} = 2$ |
| $CS_{index} = 1$ | $CS_{index} = 0$ | k = 0 | | 12 | k = 0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

TABLE 18

Example of CS/OC Sequence Remapping, Slot 1, $\Delta_{shift}^{PUCCH} = 2$, Normal CP, $\phi = 1$

| Cell specific cyclic shift offset | | RS orthogonal cover | | | ACK/NACK orthogonal cover | | |
|---|---|---|---|---|---|---|---|
| $\delta_{offset} = 1$ | $\delta_{offset} = 0$ | $OC_{index} = 0$ | $OC_{index} = 1$ | $OC_{index} = 2$ | $OC_{index} = 0$ | $OC_{index} = 1$ | $OC_{index} = 2$ |
| $CS_{index} = 1$ | $CS_{index} = 0$ | k = 0 | | 2 | k = 17 | | 1 |
| 2 | 1 | | 1 | | | 0 | |
| 3 | 2 | 3 | | 5 | 2 | | 4 |
| 4 | 3 | | 4 | | | 3 | |
| 5 | 4 | 6 | | 8 | 5 | | 7 |
| 6 | 5 | | 7 | | | 6 | |
| 7 | 6 | 9 | | 11 | 8 | | 10 |
| 8 | 7 | | 10 | | | 9 | |
| 9 | 8 | 12 | | 14 | 11 | | 13 |
| 10 | 9 | | 13 | | | 12 | |
| 11 | 10 | 15 | | 17 | 14 | | 16 |
| 0 | 11 | | 16 | | | 15 | |

TABLE 19

Example of CS/OC Sequence Remapping, Slot 0, $\Delta_{shift}^{PUCCH} = 2$, Normal CP

| Cell specific cyclic shift offset | | RS orthogonal cover | | | ACK/NACK orthogonal cover | | |
|---|---|---|---|---|---|---|---|
| $\delta_{offset} = 1$ | $\delta_{offset} = 0$ | $OC_{index} = 0$ | $OC_{index} = 1$ | $OC_{index} = 2$ | $OC_{index} = 0$ | $OC_{index} = 1$ | $OC_{index} = 2$ |
| $CS_{index} = 1$ | $CS_{index} = 0$ | k = 0 | | 12 | k = 0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

TABLE 20

Example of CS/OC Sequence Remapping, Slot 1, $\Delta_{shift}^{PUCCH} = 2$, Normal CP, $\phi = 2$

| Cell specific cyclic shift offset | | RS orthogonal cover | | | ACK/NACK orthogonal cover | | |
|---|---|---|---|---|---|---|---|
| $\delta_{offset} = 1$ | $\delta_{offset} = 0$ | $OC_{index} = 0$ | $OC_{index} = 1$ | $OC_{index} = 2$ | $OC_{index} = 0$ | $OC_{index} = 1$ | $OC_{index} = 2$ |
| $CS_{index} = 1$ | $CS_{index} = 0$ | k = 0 | | 2 | k = 16 | | 0 |
| 2 | 1 | | 1 | | | 17 | |
| 3 | 2 | 3 | | 5 | 1 | | 3 |
| 4 | 3 | | 4 | | | 2 | |
| 5 | 4 | 6 | | 8 | 4 | | 6 |
| 6 | 5 | | 7 | | | 5 | |
| 7 | 6 | 9 | | 11 | 7 | | 9 |
| 8 | 7 | | 10 | | | 8 | |
| 9 | 8 | 12 | | 14 | 10 | | 12 |
| 10 | 9 | | 13 | | | 11 | |
| 11 | 10 | 15 | | 17 | 13 | | 15 |
| 0 | 11 | | 16 | | | 14 | |

Slot Based Mapping Applied to Other Formats

As discussed above, slot based CS/OC remapping on PUCCH randomizes intra-cell interference. 3GPP TS 36.211 Release 8 defines several formats for the transmission of ACKNAK and CQI information, including format 1/1a/1b and format 2/2a/2b. In this section, applications of slot based CS/OC remapping on PUCCH are described for extended CP and for RBs containing a mixture of ACK/NAK and CQI.

PUCCH format 1/1a/1b in extended CP
PUCCH format 1/1a/1b in normal CP and within mixed RBs
PUCCH format 2/2a/2b in mixed RBs For notation simplicity, ACK/NAK is referred to as PUCCH format 1/1a/1b and CQI as PUCCH format 2/2a/2b. PUCCH format 1/1a/1b share the same structure, which is used for the transmission of SRI, persistent ACK/NAK, and dynamic ACK/NAK. PUCCH format 2/2a/2b is intended for CQI and concurrent transmission of CQI and ACK/NAK. Moreover, mixed RBs refer to RBs containing a mixture of ACK/NAK and CQI.

In the following, $n_{PUCCH}^{(1)}$ denotes the resource index for PUCCH format 1/1a/1b, and $n_{PUCCH}^{(2)}$ denotes the resource index for PUCCH format 2/2a/2b. In this section, slot based CS/OC remapping on PUCCH is described, with the notations adopted from 3GPP TS 36.211 Release 8. For notations not explicitly described in this document, please refer to TS 36.211 Release 8. The notation $n_s$ refers to the slot number of a given OFDM symbol. $N_{cs}^{(1)}$ refers to a number of cyclic shifts used for PUCCH formats 1/1a/1b in a resource block with a mix of formats 1/1a/1b and 2/2a/2b. $N_{sc}^{RB}$ denotes a number of CS per resource block (RB). $N_{RB}^{(2)}$ denotes bandwidth reserved for PUCCH formats 2/2a/2b, expressed in multiples of $N_{sc}^{RB}$.

Slot Based CS/OC Remapping for PUCCH Format 1/1a/1b

The resource Indices in the two slots of a subframe to which the PUCCH is mapped are given by $$n'(n_s) = \begin{cases} n_{PUCCH}^{(1)} & \text{if } n_{PUCCH}^{(1)} < c \cdot N_{cs}^{(1)}/\Delta_{shift}^{PUCCH} \\ (n_{PUCCH}^{(1)} - c \cdot N_{cs}^{(1)}/\Delta_{shift}^{PUCCH}) \bmod (c \cdot N_{sc}^{RB}/\Delta_{shift}^{PUCCH}) & \text{otherwise} \end{cases}$$

for $n_s \bmod 2=0$ and by $$n'(n_s) = \begin{cases} [3(n'(n_s-1)+1)] \bmod (3N_{sc}^{RB}/\Delta_{shift}^{PUCCH}+1)-1 & \text{for normal cyclic prefix and } n_{PUCCH}^{(1)} \geq c \cdot N_{cs}^{(1)}/\Delta_{shift}^{PUCCH} \\ \lfloor h/c \rfloor + (h \bmod c) \cdot N'/\Delta_{shift}^{PUCCH} & \text{otherwise} \end{cases}$$

for $n_s \bmod 2=1$, where $h=(n'(n_s-1)+d) \bmod (cN'/\Delta_{shift}^{PUCCH})$, with d=2 for normal CP and d=0 for extended CP. Note from 3GPP 36.211 Release 8:

$$N' = \begin{cases} N_{cs}^{(1)} & \text{if } n_{PUCCH}^{(1)} < c \cdot N_{cs}^{(1)}/\Delta_{shift}^{PUCCH} \\ N_{sc}^{RB} & \text{otherwise} \end{cases}$$

$$c = \begin{cases} 3 & \text{normal cyclic prefix} \\ 2 & \text{extended cyclic prefix} \end{cases}$$

$$\Delta_{shift}^{PUCCH} \in \begin{cases} \{1, 2, 3\} & \text{for normal cyclic prefix} \\ \{2, 3\} & \text{for extended cyclic prefix} \end{cases}$$

$$\delta_{offset}^{PUCCH} \in \{0, 1, \ldots, \Delta_{shift}^{PUCCH} - 1\}$$

Slot Based CS/OC Remapping for PUCCH Format 2/2a/2b

Resources used for transmission of PUCCH formats 2/2a/2b are identified by a resource index $n_{PUCCH}^{(2)}$, where $$n'(n_s) = \begin{cases} n_{PUCCH}^{(2)} \bmod N_{sc}^{RB} & \text{if } n_{PUCCH}^{(2)} < N_{sc}^{RB} N_{RB}^{(2)} \\ (n_{PUCCH}^{(2)} + N_{cs}^{(1)}+1+\delta_{offset}^{PUCCH}) \bmod N_{sc}^{RB} & \text{otherwise} \end{cases}$$

for $n_s \bmod 2=0$ and by $$n'(n_s) = \begin{cases} [N_{sc}^{RB}(n'(n_s-1)+1)] \bmod (N_{sc}^{RB}+1)-1 & \text{if } n_{PUCCH}^{(2)} < N_{sc}^{RB} N_{RB}^{(2)} \\ (N_{sc}^{RB}-2-n_{PUCCH}^{(2)} \bmod N_{sc}^{RB}+\Delta_{offset}^{PUCCH}) \bmod N_{sc}^{RB} & \text{otherwise} \end{cases}$$

for $n_s \bmod 2=1$.

Note additional cell specific cyclic shift hopping among SC-OFDM symbols within a slot may be applied. The above CS/OC remapping is applicable to the first SC-OFDMA symbol in each slot. Examples of the proposed slot based CS/OC remapping are provided in Tables 21-26. It is not necessary to use all available CQI channels in the mixed RB.

TABLE 21

Extended CP, N' = 12, c = 2, $\Delta_{shift}^{PUCCH}$ = 2

| CS Offset | | Slot 0 | | Slot 1 | |
|---|---|---|---|---|---|
| $\delta_{offset}=1$ | $\delta_{offset}=0$ | OC 0 | OC 1 | OC 0 | OC 1 |
| CS 1 | CS 0 | A/N #0 | | A/N #0 | |
| CS 2 | CS 1 | | A/N #6 | | A/N #1 |
| CS 3 | CS 2 | A/N #1 | | A/N #2 | |
| CS 4 | CS 3 | | A/N #7 | | A/N #3 |
| CS 5 | CS 4 | A/N #2 | | A/N #4 | |
| CS 6 | CS 5 | | A/N #8 | | A/N #5 |
| CS 7 | CS 6 | A/N #3 | | A/N #6 | |
| CS 8 | CS 7 | | A/N #9 | | A/N #7 |
| CS 9 | CS 8 | A/N #4 | | A/N #8 | |
| CS 10 | CS 9 | | A/N #10 | | A/N #9 |
| CS 11 | CS 10 | A/N #5 | | A/N #10 | |
| CS 0 | CS 11 | | A/N #11 | | A/N #11 |

TABLE 22

Extended CP, N' = 12, c = 2, $\Delta_{shift}^{PUCCH} = 3$

| CS Offset | | | Slot 0 | | Slot 1 | |
|---|---|---|---|---|---|---|
| $\delta_{offset} = 2$ | $\delta_{offset} = 1$ | $\delta_{offset} = 0$ | OC 0 | OC 1 | OC 0 | OC 1 |
| CS 2 | CS 1 | CS 0 | A/N #0 | | A/N #0 | |
| CS 3 | CS 2 | CS 1 | | A/N #4 | | A/N #1 |
| CS 4 | CS 3 | CS 2 | | | | |
| CS 5 | CS 4 | CS 3 | A/N #1 | | A/N #2 | |
| CS 6 | CS 5 | CS 4 | | A/N #5 | | A/N #3 |
| CS 7 | CS 6 | CS 5 | | | | |
| CS 8 | CS 7 | CS 6 | A/N #2 | | A/N #4 | |
| CS 9 | CS 8 | CS 7 | | A/N #6 | | A/N #5 |
| CS 10 | CS 9 | CS 8 | | | | |
| CS 11 | CS 10 | CS 9 | A/N #3 | | A/N #6 | |
| CS 0 | CS 11 | CS 10 | | A/N #7 | | A/N #7 |
| CS 1 | CS 0 | CS 11 | | | | |

TABLE 23

Extended CP, Mixed RB, N' = 6, c = 2, $\Delta_{shift}^{PUCCH} = 2$

| CS Offset | | Slot 0 | | Slot 1 | |
|---|---|---|---|---|---|
| $\delta_{offset} = 1$ | $\delta_{offset} = 0$ | OC 0 | OC 1 | OC 0 | OC 1 |
| CS 1 | CS 0 | A/N #0 | | A/N #0 | |
| CS 2 | CS 1 | | A/N #3 | | A/N #1 |
| CS 3 | CS 2 | A/N #1 | | A/N #2 | |
| CS 4 | CS 3 | | A/N #4 | | A/N #3 |
| CS 5 | CS 4 | A/N #2 | | A/N #4 | |
| CS 6 | CS 5 | | A/N #5 | | A/N #5 |
| CS 7 | CS 6 | Guard CS | | Guard CS | |
| CS 8 | CS 7 | CQI #0 | | CQI #3 | |
| CS 9 | CS 8 | CQI #1 | | CQI #2 | |
| CS 10 | CS 9 | CQI #2 | | CQI #1 | |
| CS 11 | CS 10 | CQI #3 | | CQI #0 | |
| CS 0 | CS 11 | Guard CS | | Guard CS | |

TABLE 24

Extended CP, Mixed RB, N' = 6, c = 2, $\Delta_{shift}^{PUCCH} = 3$

| CS Offset | | | Slot 0 | | Slot 1 | |
|---|---|---|---|---|---|---|
| $\delta_{offset} = 2$ | $\delta_{offset} = 1$ | $\delta_{offset} = 0$ | OC 0 | OC 1 | OC 0 | OC 1 |
| CS 2 | CS 1 | CS 0 | A/N #0 | | A/N #0 | |
| CS 3 | CS 2 | CS 1 | | A/N #2 | | A/N #1 |
| CS 4 | CS 3 | CS 2 | | | | |
| CS 5 | CS 4 | CS 3 | A/N #1 | | A/N #2 | |
| CS 6 | CS 5 | CS 4 | | A/N #3 | | A/N #3 |
| CS 7 | CS 6 | CS 5 | | | | |
| CS 8 | CS 7 | CS 6 | Guard CS | | Guard CS | |
| CS 9 | CS 8 | CS 7 | CQI #0 | | CQI #3 | |
| CS 10 | CS 9 | CS 8 | CQI #1 | | CQI #2 | |
| CS 11 | CS 10 | CS 9 | CQI #2 | | CQI #1 | |
| CS 0 | CS 11 | CS 10 | CQI #3 | | CQI #0 | |
| CS 1 | CS 0 | CS 11 | Guard CS | | Guard CS | |

TABLE 25

Normal CP, Mixed RB, N' = 6, c = 3, $\Delta_{shift}^{PUCCH} = 2$

| CS Offset | | Slot 0 | | | Slot 1 | | |
|---|---|---|---|---|---|---|---|
| $\delta_{offset} = 1$ | $\delta_{offset} = 0$ | OC 0 | OC 1 | OC 2 | OC 1 | OC 1 | OC 2 |
| CS 1 | CS 0 | A/N #0 | | A/N #6 | A/N #7 | | A/N #0 |
| CS 2 | CS 1 | | A/N #3 | | | A/N #8 | |
| CS 3 | CS 2 | A/N #1 | | A/N #7 | A/N #1 | | A/N #3 |
| CS 4 | CS 3 | | A/N #4 | | | A/N #2 | |
| CS 5 | CS 4 | A/N #2 | | A/N #8 | A/N #4 | | A/N #6 |
| CS 6 | CS 5 | | A/N #5 | | | A/N #5 | |
| CS 7 | CS 6 | Guard CS | | | Guard CS | | |
| CS 8 | CS 7 | CQI #0 | | | CQI #3 | | |
| CS 9 | CS 8 | CQI #1 | | | CQI #2 | | |
| CS 10 | CS 9 | CQI #2 | | | CQI #1 | | |
| CS 11 | CS 10 | CQI #3 | | | CQI #0 | | |
| CS 0 | CS 11 | Guard CS | | | Guard CS | | |

TABLE 26

Normal CP, Mixed RB, N' = 6, c = 3, $\Delta_{shift}^{PUCCH} = 3$

| CS Offset | | | Slot 0 | | | Slot 1 | | |
|---|---|---|---|---|---|---|---|---|
| $\delta_{offset} = 2$ | $\delta_{offset} = 1$ | $\delta_{offset} = 0$ | OC 0 | OC 1 | OC 2 | OC 0 | OC 1 | OC 2 |
| CS 2 | CS 1 | CS 0 | A/N #0 | | | A/N #4 | | |
| CS 3 | CS 2 | CS 1 | | A/N #2 | | | A/N #5 | |
| CS 4 | CS 3 | CS 2 | | | A/N #4 | | | A/N #0 |
| CS 5 | CS 4 | CS 3 | A/N #1 | | | A/N #1 | | |
| CS 6 | CS 5 | CS 4 | | A/N #3 | | | A/N #2 | |
| CS 7 | CS 6 | CS 5 | | | A/N #5 | | | A/N #3 |
| CS 8 | CS 7 | CS 6 | Guard CS | | | Guard CS | | |

TABLE 26-continued

Normal CP, Mixed RB, N' = 6, c = 3, $\Delta_{shift}^{PUCCH}$ = 3

| CS Offset | | | Slot 0 | | | Slot 1 | | |
|---|---|---|---|---|---|---|---|---|
| $\delta_{offset} = 2$ | $\delta_{offset} = 1$ | $\delta_{offset} = 0$ | OC 0 | OC 1 | OC 2 | OC 0 | OC 1 | OC 2 |
| CS 9 | CS 8 | CS 7 | | CQI #0 | | | CQI #3 | |
| CS 10 | CS 9 | CS 8 | | CQI #1 | | | CQI #2 | |
| CS 11 | CS 10 | CS 9 | | CQI #2 | | | CQI #1 | |
| CS 0 | CS 11 | CS 10 | | CQI #3 | | | CQI #0 | |
| CS 1 | CS 0 | CS 11 | | Guard CS | | | Guard CS | |

Cell Specific Intra-Slot CS Hopping

In another embodiment, the cell ID is used to distinguish OC/CS values. Let $\alpha^{(0)}$ be the cyclic shift index for a UE and $l$ denotes the OFDM symbol index within a slot ($0 \leq l \leq 6$). Then the cell specific CS hopping within a slot can be described by the following equation, where $N_{SC}^{RB}=12$ denotes the number of cyclic shift per RB.

$$\alpha(l)=(\alpha^{(0)}+f_{hop}(l)) \bmod N_{sc}^{RB}$$

Note that $\alpha^{(0)}$ refers to $\alpha_{slot,0}^{(0)}$ or $\alpha_{slot,1}^{(0)}$, depending on the slot number.

The cell specific CS hopping pattern may be a function of subframe number "SFN" and cell ID "Cell ID". In particular, $$f_{hop}(l)=l \times ((SFN+CellID) \bmod N_{SC}^{RB}),$$

or $$f_{hop}(l)=l \times ((CellID) \bmod N_{SC}^{RB}).$$

another possible $f_{hop}(l)$ can be $$f_{hop}(l)=l \times ((SFN+CellID) \bmod (N_{SC}^{RB}-1))+1),$$

Or $$f_{hop}(l)=l \times (((CellID) \bmod (N_{SC}^{RB}-1))+1).$$

This cell specific CS hopping applies to all OFDM symbols (data and RS) of all types of transmissions on PUCCH, including dynamic ACK/NAK, persistent ACK/NAK, CQI, SRI, etc.

Figure 5:
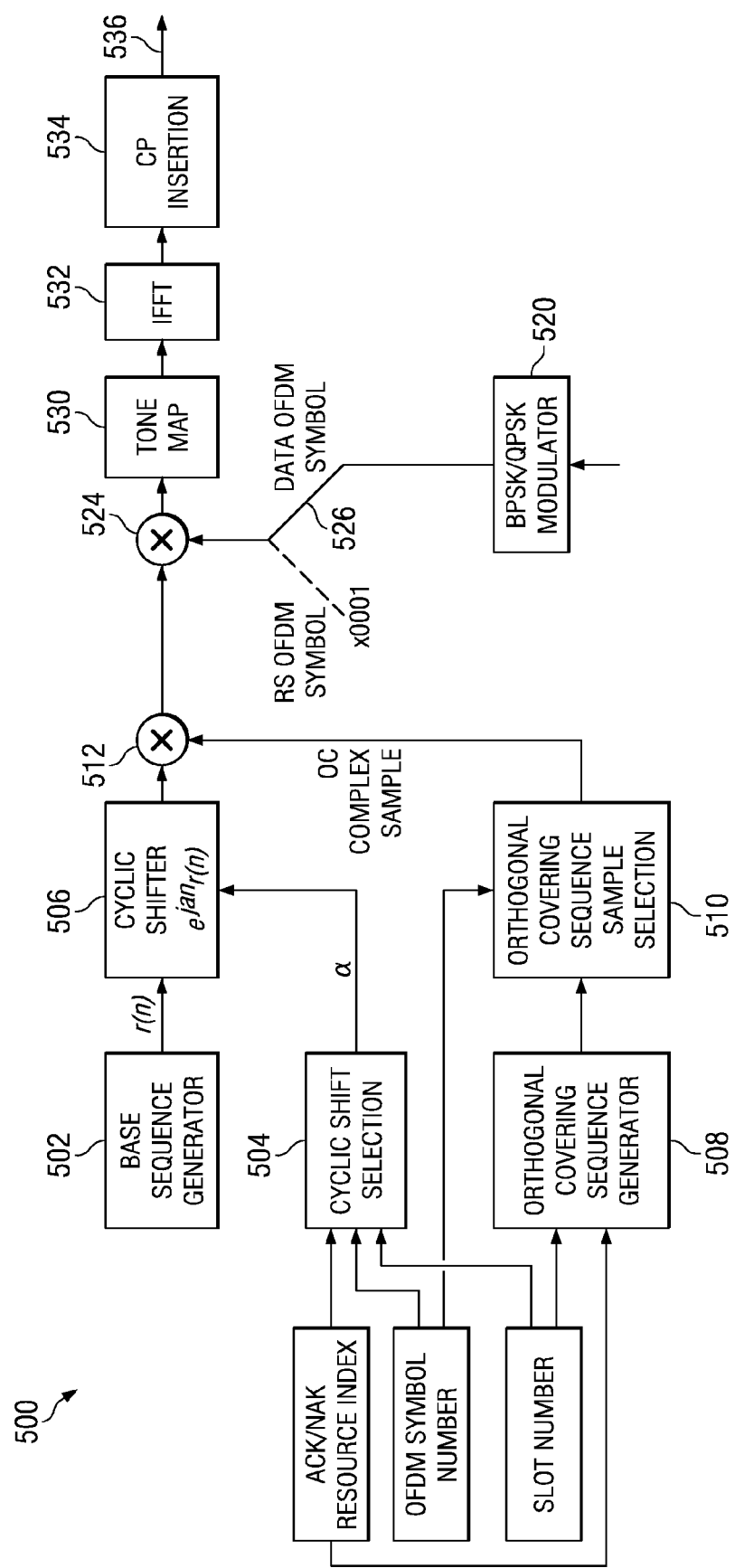
FIG. 5 is a block diagram of an illustrative transmitter for transmitting the coherent ACKNAK structures of FIG. 2.

FIG. 5 is a block diagram of an illustrative transmitter 500 for transmitting the coherent structures of FIGS. 2-4. Elements of the transmitter may be implemented as components in a fixed or programmable processor by executing instructions stored in memory. The UE generates a CAZAC-like (e.g. ZC or extended ZC or zero-autocorrelation QPSK computer-generated) sequence using base sequence generator 502. A cyclic shift value is selected for each symbol based on the ACK/NAK resource index (in the ACK/NAK multiplex), the OFDM symbol number and the slot number in cyclic shift selecting module 504. The base sequence is then shifted by cyclic shifter 506 on a symbol by symbol basis using shift values provided by cyclic shift selection module 504.

The UE generates both RS and data orthogonal covering sequences 202 and 204, for example, using orthogonal sequence generator 508. The sequence length is equal to the number of covered OFDM symbols. The number of data OFDM symbols is four in the FIG. 2 example. Sequences used for this orthogonal covering are typically length-4 Walsh-Hadamard sequences, as described in more detail above, Orthogonal sequence generator 508 generates one sequence out of the set of orthogonal sequences based on the ACK/NAK resource index (in the ACK/NAK multiplex). As described above, the block spreading codes and cyclic shifted root sequences are remapped in a slot based manner in the time-frequency resource according to the proposed method, as in the above described examples.

The orthogonal covering sequence sample selection 510 selects and issues the appropriate sequence complex sample from the appropriate sequence (RS or data) based on the index of the OFDM symbol being currently generated.

The cyclic shifted base sequence vector is element-wise complex-multiplied by the selected orthogonal covering complex sample in complex multiplier 512.

The data is organized as either one or two bits in this embodiment and is input to modulator block 520. The data bearing OFDM symbols are binary phase shift key (BPSK) or quadrature phase shift key (QPSK) modulated when the data information is one or two bits wide, respectively. The switch 526 selects, based on the OFDM symbol type (data or RS), which of the modulation complex sample or "1" feeds the complex multiplier 524.

The result of the element-wise complex multiplication is mapped onto a designated set of tones (sub-carriers) using the Tone Map 530. The UE next performs IFFT of the mapped signal using the IFFT 532. A cyclic prefix is created and added in module 534 to form a final fully formed uplink signal 536.

Figure 6:
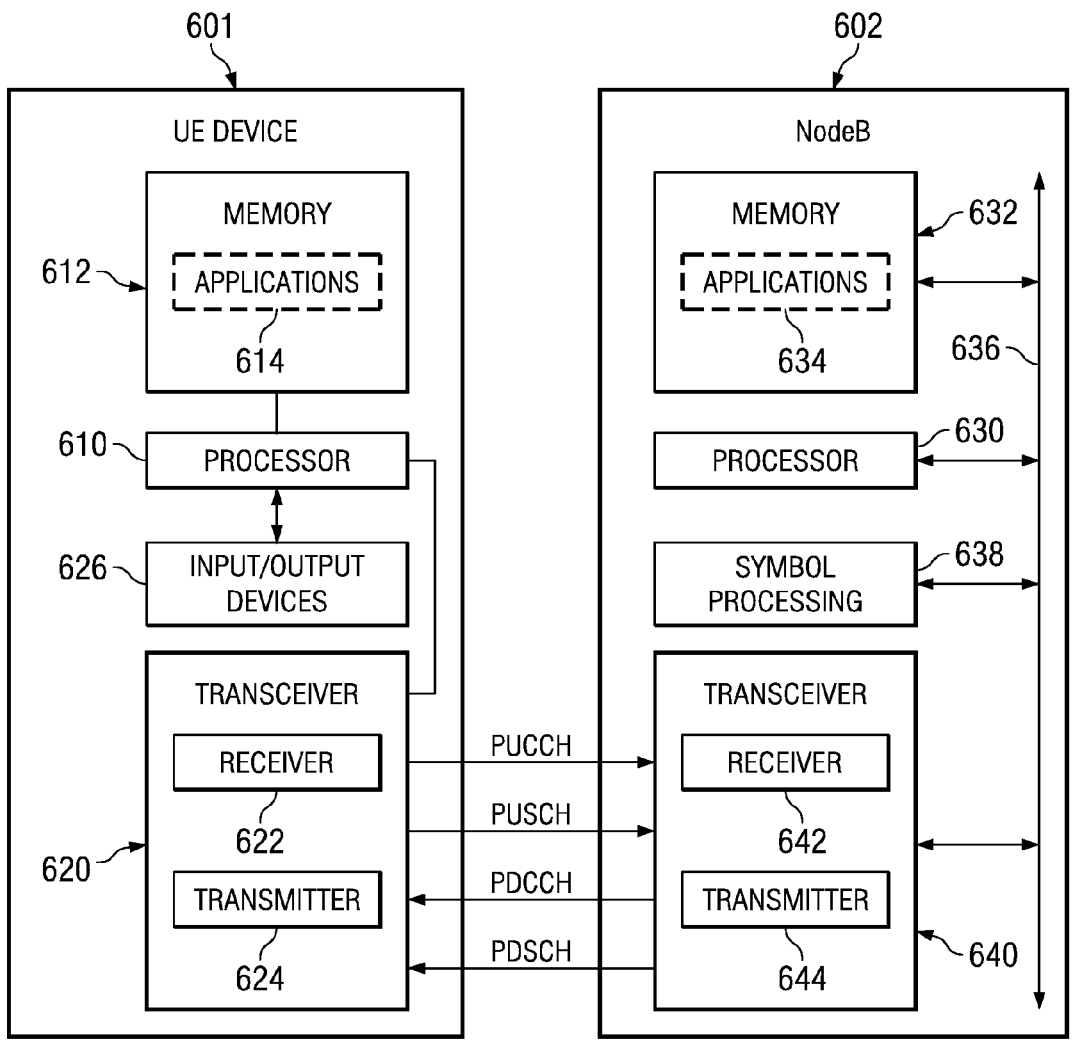
FIG. 6 is a block diagram of a Node B and a User Equipment for use in the network system of FIG. 1.

FIG. 6 is a block diagram illustrating operation of a NodeB 602 and a mobile UE 601 in the network system of FIG. 1. The mobile UE device 601 may represent any of a variety of devices such as a server, a desktop computer, a laptop computer, a cellular phone, a Personal Digital Assistant (PDA), a smart phone or other electronic devices. In some embodiments, the electronic mobile UE device 601 communicates with the NodeB 602 based on a LTE or E-UTRAN protocol. Alternatively, another communication protocol now known or later developed can be used.

As shown, the mobile UE device 601 comprises a processor 610 coupled to a memory 612 and a Transceiver 620. The memory 612 stores (software) applications 614 for execution by the processor 610. The applications could comprise any known or future application useful for individuals or organizations. As an example, such applications could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications, at least some of the applications may direct the mobile UE device 601 to transmit UL signals to the NodeB (base-station) 602 periodically or continuously via the transceiver 620. In at least some embodiments, the mobile UE device 601 identifies a Quality of Service (QoS) requirement when requesting an uplink resource from the NodeB 602. In some cases, the QoS requirement may be implicitly derived by the NodeB 602 from the type of traffic supported by the mobile UE device 601. As an example, VOIP and gaming applications often involve low-latency uplink (UL) transmissions while High Throughput (HTP)/Hypertext Transmission Protocol (HTTP) traffic can involve high-latency uplink transmissions.

Transceiver 620 includes uplink logic which may be implemented by execution of instructions that control the operation of the transceiver. Some of these instructions may be stored in memory 612 and executed when needed by processor 610. As would be understood by one of skill in the art, the components of the Uplink Logic may involve the physical (PHY) layer and/or the Media Access Control (MAC) layer of the transceiver 620. Transceiver 620 includes one or more receivers 622 and one or more transmitters 624.

Processor 610 may send or receive data to various input/output devices 626. A subscriber identity module (SIM) card stores and retrieves information used for making calls via the cellular system. A Bluetooth baseband unit may be provided for wireless connection to a microphone and headset for sending and receiving voice data. Processor 610 may send information to a display unit for interaction with a user of the mobile UE during a call process. The display may also display pictures received from the network, from a local camera, or from other sources such as a USB connector. Processor 610 may also send a video stream to the display that is received from various sources such as the cellular network via RF transceiver 622 or the camera.

During transmission and reception of voice data or other application data, transmitter 624 sends ACKNAK information via the PUCCH and/or the PUSCH links to the serving NodeB 602, as described in more detail above using CS hopping and a slot based CS/OC remapping scheme for PUCCH in correspondence to DL packets. In this embodiment, the CS hopping and slot based CS/OC remapping scheme is embodied by executing instructions stored in memory 612 by processor 610. In other embodiments, the remapping scheme may be embodied by a separate processor/memory unit, by a hardwired state machine, or by other types of control logic, for example.

The remapped ACKNAK slot is then transmitted by transmitter 624, as described in more detail with regard to FIG. 5.

NodeB 602 comprises a Processor 630 coupled to a memory 632, symbol processing circuitry 638, and a transceiver 640 via backplane bus 636. The memory stores applications 634 for execution by processor 630. The applications could comprise any known or future application useful for managing wireless communications. At least some of the applications 634 may direct the base-station to manage transmissions to or from the user device 601.

Transceiver 640 comprises an uplink Resource Manager, which enables the NodeB 602 to selectively allocate uplink PUSCH resources to the user device 601. As would be understood by one of skill in the art, the components of the uplink resource manager may involve the physical (PHY) layer and/or the Media Access Control (MAC) layer of the transceiver 640. Transceiver 640 includes a Receiver(s) 642 for receiving transmissions from various UE within range of the NodeB and transmitter(s) 644 for transmitting data and control information to the various UE within range of the NodeB.

The uplink resource manager executes instructions that control the operation of transceiver 640. Some of these instructions may be located in memory 632 and executed when needed on processor 630. The resource manager controls the transmission resources allocated to each UE that is being served by NodeB 602 and broadcasts control information via the physical downlink control channel PDCCH.

Symbol processing circuitry 638 performs demodulation and reverse rate matching using known techniques. ACK-NAK information received from UE 601 is demodulated using an agreed upon slot based CS/OS remapping scheme as described in more detail above. The specific CS/OS remapping scheme that a given UE is to use may be communicated from the NodeB to the UE via a control transmission. Alternately, remapping parameters may be agreed upon and each UE In the network is configured accordingly in an offline manner, for example.

Figure 7:
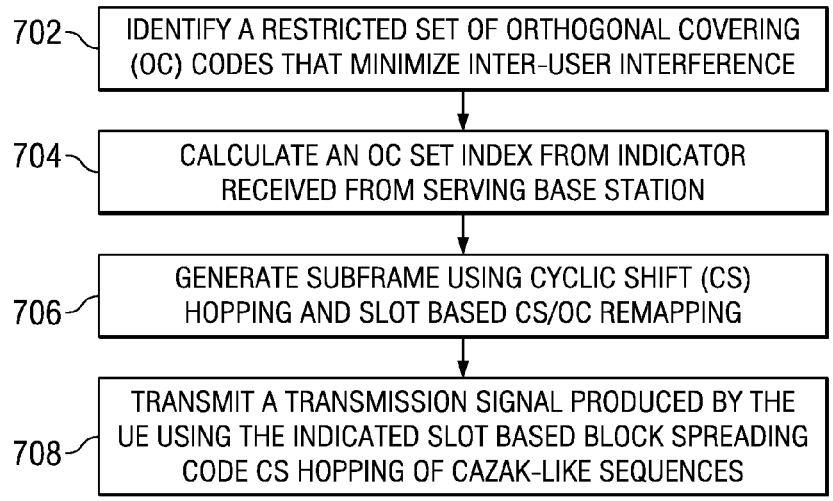
FIG. 7 is a flow diagram illustrating assignment of block spreading codes and CAZAK-like sequences according to an embodiment of the present invention.

FIG. 7 is a flow diagram illustrating assignment of block spreading codes and CAZAK-like sequences according to an embodiment of the present invention. As described above, orthogonal block spreading (OC) codes can be applied to multiple users for simultaneous transmission within the same frequency-time resource. A restricted set of block spreading codes is identified 702 as described above. A property of the restricted subset of block spreading codes is that element-wise product of at least a pair of orthogonal sequences in the restricted subset is mirror symmetric. Generally, the set of OC codes that will be used in a network is agreed upon and disseminated to all UE in the network, either by control level broadcasts, or by offline configuration, such as at point of purchase, for example.

The UE receives 704 an Indication from the serving NodeB to allow it to determine which OC to use for a particular subframe. For example, by receiving a cell ID knowing a subframe number, the UE can calculate OC index into a table of OCs, using equations 1-4 above. For example, Tables 1 and 3 may by used and indexed with the calculated OC set index.

In this embodiment, a CAZAK-like sequence is used in the frequency-time resource. As described above, the root sequence may be cyclic shifted or phase ramped to form a set of sequences. In one embodiment, a UE may generate subframes using the same CS for all symbols and using a different OC for each slot of a subframe.

In another embodiment, the UE generates a subframe using cyclic shift hopping and slot based CS/OC remapping based on channel index using one set of the equations described in more detail above. In general, the CSs used in the first slot of a given subframe are different from those used in the second slot. Similarly, the OC is different for each slot of a given subframe. Tables 4-26 Illustrate various examples of slot based CS/OC sequence remapping. The channel index is generally received by a given UE as part of a scheduling allocation from the serving NodeB.

When the UE is ready to transmit, it forms a modulated transmission signal that is compatible with the coherent orthogonal structures illustrated in FIGS. 2-4. The indicated block spreading code assigned by the eNB is used with the selected CAZAK-like sequences in a symbol based hopping manner using the block spreading operation illustrated in FIG. 3. This transmission signal is received 708 by the eNB serving the UE and demodulated by the eNB.

Other Embodiments

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot. Block spreading codes can be assigned as described herein for transmission of data and control information, including but not limited to ACK/NAK and SRI.

While only a single set of OC was defined in this embodiment for the RS portion of the subframe, in another embodiment more than one set of OC may be defined and therefore mapping may also be applied to the RS portion.

While a maximum of thirty-six potential channels are defined in the present embodiments for one resource block, not all thirty six channels are used simultaneously. In another embodiment the size of a resource block and the resultant number of potential channels may be increased or decreased.

In an embodiment of an eNB operating a wireless communication system, the eNB has a processor coupled to a memory circuit storing instructions for execution by the processor. A receiver and transmitter is controllably coupled to the processor. The processor is operable to derive a first index n1, derive a second index n2 using the first index n1, determine a first orthogonal covering (OC) index and a first cyclic shift (CS) using the derived index n1, and determine a second OC and a second CS using the derived index n2. The receiver is operable to receive a first slot of a subframe using the OC indexed by the first OC index and the first CS and to receive a second slot of the subframe using the OC indexed by the second OC index and the second CS.

In an embodiment of the eNB, each received slot comprises of a plurality of symbols; at least one symbol in the first received slot is generated using a first cyclically shifted or phase ramped CAZAC-like sequence and the first CS; and at least one symbol in the second received slot is generated using a second cyclically shifted or phase ramped CAZAC-like sequence and the second CS.

In an embodiment of the eNB, the first OC comprises of a plurality of samples; a symbol in the first received slot is generated by element-wise multiplying the first cyclically shifted or phase ramped CAZAC-like sequence in the symbol with one of the plurality of OC samples.

In an embodiment of the eNB, the second index n2 is generated using the first index n1 according to $n2=\lfloor h/c \rfloor+(h \bmod c) \cdot N'/\Delta_{shift}^{PUCCH}$, and $h=(n1+d) \bmod (cN'/\Delta_{shift}^{PUCCH})$, where c, N' and $\Delta_{shift}^{PUCCH}$ are positive integers and d is a non-negative integer.

In an embodiment of the eNB, c denotes the number of usable OC; N' denotes the number of usable cyclic shifts; $\Delta_{shift}^{PUCCH}$ denotes the cyclic shift separation; and d is a non-negative integer.

In an embodiment of the eNB, c=3 for normal CP and c=2 for extended CP; 0<N'≤12; 1≤$\Delta_{shift}^{PUCCH}$≤3; and d=2 for normal CP and d=0 for extended CP.

In an embodiment of the eNB, the processor is further operable to demodulate a portion of the symbols in the first slot and in the second slot to recover ACKNAK information.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method for operating a wireless a communication system, comprising;
   deriving a first index n1;
   deriving a second index n2 using the first index n1;
   determining a first orthogonal covering (OC) index and a first cyclic shift (CS) using the derived index n1;
   determining a second OC and a second CS using the derived index n2;
   generating in an apparatus a first slot of a subframe using the OC indexed by the first OC index and the first CS;
   generating in an apparatus a second slot of the subframe using the OC indexed by the second OC index and the second CS.

2. A method for operating a wireless communication system, comprising:
   deriving a first value $m_1$ and a second value $m_2$ using a common value m;
   determining a first cyclic shift (CS) using $m_1$;
   determining a second CS using $m_2$;
   generating in an apparatus a first slot f a subframe using the first CS;
   generating in an apparatus a second slot of the subframe using the second CS;
   wherein the first slot and the second slot each comprises a plurality of symbols;
   wherein at least one symbol in the first slot is generated using a CAZAC-like sequence cyclic shifted by the first CS;
   wherein at least one symbol in the second slot is generated sing a CAZAC-like sequence cyclic shifted by the second CS.

3. An apparatus for operating in a wireless communication system, comprising:
   a processor coupled to a memory circuit holding instruction for execution by the processor;
   a receiver and transmitter controllably coupled to the processor;
   wherein the processor is enabled to:
     derive a first index n1;
     derive a second index n2 using the first index n1;
     determine a first orthogonal covering (OC) index and a first cyclic shift (CS) using the derived index n1;
     determine a second OC and a second CS using the derived index n2;
     generate a first slot of a subframe using the OC indexed by the first OC index and the first CS;
     generate a second slot of the subframe using the OC indexed by the second OC index and the second CS; and
   wherein the transmitter is enabled to transmit the first and second slots of the subframe.

* * * * *